United States Patent
Mizutani et al.

(10) Patent No.: US 7,309,541 B2
(45) Date of Patent: Dec. 18, 2007

(54) FUEL CELL

(75) Inventors: Shunsuke Mizutani, Itami (JP); Shuji Hitomi, Otsu (JP); Hideo Yasuda, Otsu (JP); Masanori Yamachi, Nagaokakyo (JP)

(73) Assignee: GS Yuasa Corporation, Kyoto (JP)

( * ) Notice: Subject to any disclaimer, the term of this patent is extended or adjusted under 35 U.S.C. 154(b) by 528 days.

(21) Appl. No.: 10/610,947

(22) Filed: Jul. 1, 2003

(65) Prior Publication Data

US 2004/0091760 A1  May 13, 2004

(30) Foreign Application Priority Data

Jul. 4, 2002  (JP)  .............. 2002-196416
Apr. 14, 2003  (JP)  .............. 2003-108749

(51) Int. Cl.
*H01M 2/00* (2006.01)
*H01M 2/02* (2006.01)
*H01M 8/00* (2006.01)

(52) U.S. Cl. .............. 429/34; 429/13; 429/12
(58) Field of Classification Search ............. 429/34, 429/13, 244

See application file for complete search history.

(56) References Cited

U.S. PATENT DOCUMENTS 6,251,534 B1 * 6/2001 McElroy ............... 429/13
6,911,277 B2 * 6/2005 Skala et al. ............. 429/39

OTHER PUBLICATIONS

J. Soler et al, "Electrode permeability and flow-field configuration: influence on the performance of a PEMFC", *Journal of Power Sources* 118 (May 25, 2003) pp. 172-178.
M. S. Wilson et al, "Alternative Flow-Field and Backing Concept for Polymer Electrolyte Fuel Cells", *Electrochemical Society Proceedings* vol. 95-23, pp. 115-126, in Proton Conducting Membrane Fuel Cells I (S. Gottesfeld, G. Halpert and A. Landgrebe ed., Dec. 1995).

* cited by examiner

*Primary Examiner*—Patrick Joseph Ryan
*Assistant Examiner*—Helen Chu
(74) *Attorney, Agent, or Firm*—Wenderoth, Lind & Ponack, L.L.P.

(57) ABSTRACT

A fuel cell includes plural gas flow channels, a switching device, and a variable gas flow channel with the function of switching the connection between one gas flow channel and another gas flow channel from series to parallel or from parallel to series.

13 Claims, 16 Drawing Sheets

FUEL CELL

RELATED APPLICATIONS

This application is based on Japanese Patent Application Nos. 2002-196416 and 2003-108749 filed with Japan Patent Office on Jul. 4, 2002 and Apr. 14, 2003, respectively, the entire content of which is incorporated herein by reference.

BACKGROUND OF THE INVENTION

1. Field of the Invention

The present invention relates to fuel cell.

2. Description of the Related Art

There has been the urgent demand of higher performance and durability for fuel cells, especially polymer electrolyte fuel cell (PEFC) which is expected as the future power source in the field of stationary or transportation use from the environmental point of view. However this demand has not been attained by the present time, because its technological problems were mainly derived from the essential technological problems described below.

The electric power is generated by feeding the anode gas of hydrogen or hydrogen containing gas into the anode gas flow field and the cathode gas of air or oxygen containing gas into the cathode gas flow field respectively. The power is controlled by the amount of both the gases, that is, the feeding rates into the gas flow fields have to be in proportion to the loading level needed for its consumption power. When the feeding rate is increased, the gas pressure drop from inlet to outlet through the gas flow field is tremendously increased, since the gas flow plate has a long serpentine gas flow field. This means that the higher pressure drop increases the consumption of electricity for the cathode gas or fuel feed pump resulting in the low efficiency of the energy. Furthermore, this means that the time to reach the steady state of a certain gas feeding rate is far from the needed one for the response to the change of needed power resulting in the further low efficiency of the energy.

When the feeding rate is decreased, water flooding occurs in the anode and cathode gas flow fields by the remaining water not to be expelled by the increase of the gas velocity through the gas flow field. The influence of water flooding is seriously appeared in the cathode site, because of the production of water is produced at the cathode according the reaction (2).

Anode: $H_2 \rightarrow 2H^+ + 2e$ (1)

Cathode: $1/2O_2 + 2H^+ + 2e \rightarrow H_2O$ (2)

Total: $H_2 + 1/2O_2 \rightarrow H_2O$ (3)

This water flooding has been considered as one of essential harmful failure mode for the performance of PEFC resulting in the drop of operation voltage and poor life performance. Therefore, the new technology to compensate both phenomena of water flooding at the low power load and high pressure drop at the high power load in the wide range is strongly demanded for the practical use of PEFC.

BRIEF SUMMARY OF THE INVENTION

The present invention provides the high performance with no water flooding phenomenon at the low power load and low pressure drop in the gas flow field of the plate with no excess power needed for the auxiliary system of air or fuel feed pump at the high power load by using the novel function of a variable gas flow channel as described in more detail later.

The fuel cell according to the invention has the following features; the fuel cell has the variable gas flow channel with the function of switching the connection between one gas flow channel and another gas flow channel from series to parallel or from parallel to series by the operation of equipped switching device according to the needed power for fuel cell.

The effect of the function of the present invention remarkably improves the performance at the low power load with the low feed rates of the reaction gases of air and fuel with free of the water flooding problem in the gas flow field in the plate by the increase of gas velocity in the gas flow field by switching to the series connection of the channels to expel the remaining water. The further effect by the present invention remarkably reduces the high pressure drop appeared at the high power load operation in the case of the usage of the above-mentioned novel function of switching to parallel connection of the channels, namely, switching the gas flow channel from the long path to the short path with from the inlet to outlet for reaction gas. This function leads to save the consumption of energy needed for the auxiliary apparatuses of air and fuel feed pumps resulting in the high energy efficiency of PEFC. The PEFC according to the present invention is able to operate at the condition of wide range of power load with the no water flooding and no high pressure drop resulting in the high performance and high durability performance.

DETAILED DESCRIPTION OF THE INVENTION

Figure 1:
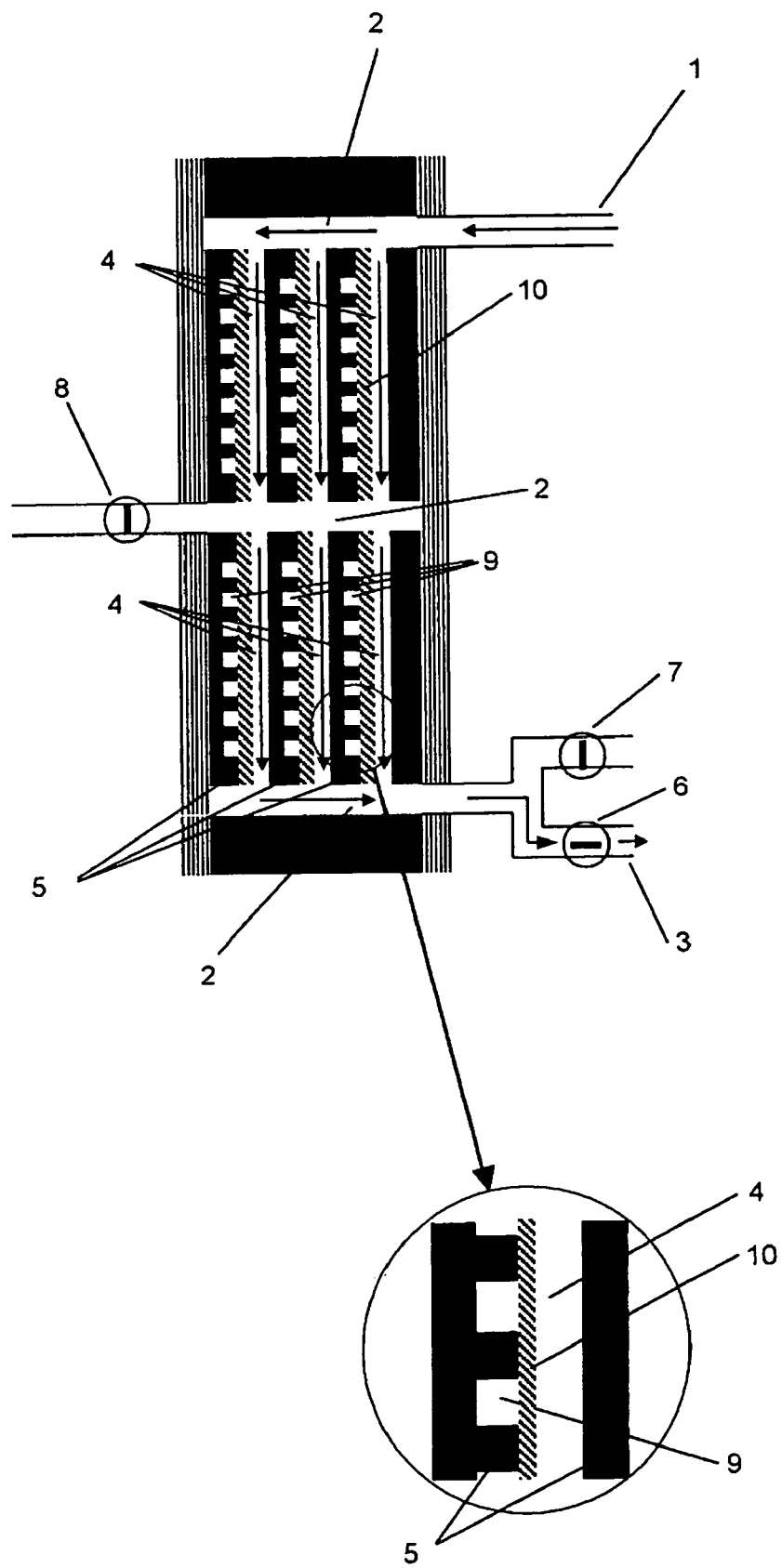
FIG. 1 shows the cross-sectional view of a schematic model with cathode gas flow direction for PEFC with a function of variable gas flow channel at the cathode side for low power load operation with series connection of gas flow channels according to the present invention.

The present invention is applied to the various types of fuel cells such as polymer electrolyte fuel cells (PEFC), phosphoric acid fuel cells (PAFC), molten carbon fuel cells (MCFC), alkaline fuel cells (AFC), and solid oxide fuel cells (SOFC). Especially, the present invention is effective in PEFC because of its relatively low operating temperature compared with other types of fuel cells.

A fuel cell stack is designed with several single cells in series. The fuel cell in this specification means both a stack and a single cell of a fuel cell. The PEFC described in this specification means a stack or a single cell of a PEFC. The single cell is mainly composed of the following serial constitution parts; an end plate, a gas flow plate, a gas diffusion backing, a membrane electrode assembly (MEA), a gas diffusion backing, a gas flow plate and an end plate. The gas flow plates are made of graphite or metallic materials and have the serpentine gas flow channel field used for the feed of cathode gas or anode gas. The gas diffusion backing is generally used of carbon fiber or carbon cloth with hydrophobic properties. The MEA is composed of an anode catalyst layer, a polymer electrolyte membrane and a cathode catalyst layer. In some cases, the gas flow plates have the coolant channel for water circulation.

A PEFC stack contains several gas flow plates which have a gas flow field. Therefore, the PEFC stack comprises the manifolds for the cathode gas and anode gas to distribute the gases into each gas flow field. Plural gas flow channels are comprised at cathode side or anode side in PEFC according to the present invention. The function of the variable gas flow channel is to switch the connection between one gas flow channel and another gas flow channel from series to parallel or from parallel to series. Namely, this function of the variable gas flow channel according to the present invention is able to change the distance of the path from the gas feed inlet to the gas outlet with simple constitution. For example, the switch from series to parallel of the connection with the function of the variable gas flow channel leads to a shorter path from the gas feed inlet to the gas outlet. This function leads to save consumption of energy needed for the auxiliary apparatuses such as air and fuel feed pumps resulting in the high energy efficiency of high power load for PEFC. On the other hand, the switch from parallel to series of the connection with the function of the variable gas flow channel leads to a longer path from the gas feed inlet to the gas outlet. This function leads to suppress the drop in the operation voltage of the PEFC caused by the water flooding phenomena appearing under the low power load condition. Especially, the function according to the present invention is effective for the stack of fuel cells, because flooded water at the gas flow field in the stack is hard to be removed by gas flow.

The number of the gas flow channels according to the present invention is two or equal to or greater than three for the same gas in the single cell. In the case of two gas flow channels in the PEFC for example, the variable gas flow channel is able to switch the connection from parallel to series or the reverse. The PEFC of this case is able to be compact because of simple constitution. In the case of four gas flow channels in the PEFC for example, the variable gas flow channel is able to switch the connection between three steps, 4 series, 2 series—2 parallels, and 4 parallels. The PEFC of this case is able to operate sophisticatedly at a wider range of power load.

An air pump means an oxidant supplying source that contains an air blower, an air compressor, an air fan, an air cylinder and an oxygen cylinder for example. A fuel pump means a fuel supplying source that contains a hydrogen pump, and a fuel reformer. A switching device is used for PEFC according to present invention for the appearance of variable gas flow channel functions. For the concrete examples of the switching device, there is a valve, a solenoid valve or a ball valve, and so on for the switching device. The switching device is preferred to be set in the part of a gas flow inlet, a gas flow outlet or gas flow path in order to control the gas flow. The switching device is able to be set on a part of the manifold connected to a gas flow inlet or a gas flow outlet. The automatic operation of the switching device is operated according to the magnitude of power load to control the gas flow rate, gas flow velocity or gas pressure.

The present invention provides the high efficiency for PEFC with the novel technology of the variable gas flow channel with the function of reduction of pressure drop appearing in the high power load and no occurrence of water flooding at the low power load. The function of the variable gas flow channel according to the present invention is effective for each anode side or cathode side. The PEFC, which has the function of a variable gas flow channel at the cathode side, is effective because the water flooding is easy to occur by the water generating reaction. The PEFC, which has the function of a variable gas flow channel at the anode side, is to be effective because the variation of anode gas flow velocity is large by high gas utilization. Especially, the PEFC with the function at both anode and the cathode sides provides the superior performance. The present invention is described in more detailed concrete examples with the function at cathode side as a representative model.

Figure 2:
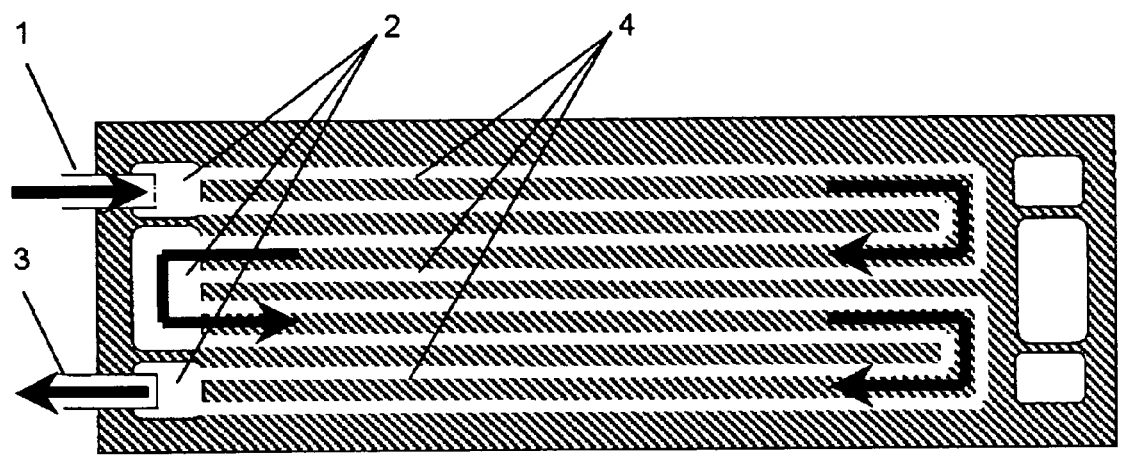
FIG. 2 shows the schematic gas flow direction of the gas flow plate of PEFC for the low power load operation with series connection of gas flow channels according to the present invention.

The cross-sectional view of the schematic model with the gas flow direction for the PEFC comprising three single cells in series with the function of the variable gas flow channel according to the present invention is shown in FIG. 1. The cathode gas of air is fed from its feed inlet 1 to the first cathode gas manifold 2 and distributed into the cathode gas flow field 4 fabricated on the gas flow plate 5 and finally to the cathode gas outlet 3 with switching device 6 through third cathode gas manifold 2. The second cathode gas manifold of the center is not used for gas distribution in this case. The switching devices 7 and 8 are closed in this case. The flow field geometry of the cathode gas flow field is not depicted for the clearness of gas direction. The anode gas flow field 9 and MEA 10 are also depicted in FIG. 1. The of connection of the two gas flow channels is in series in this case. The preferable embodiment of invention the series connection type for variable gas flow channel according to the present is shown in FIG. 2 with the same switching device operation as FIG. 1 wherein the situation is proper for the-low power load condition to suppress the water flooding.

Figure 3:
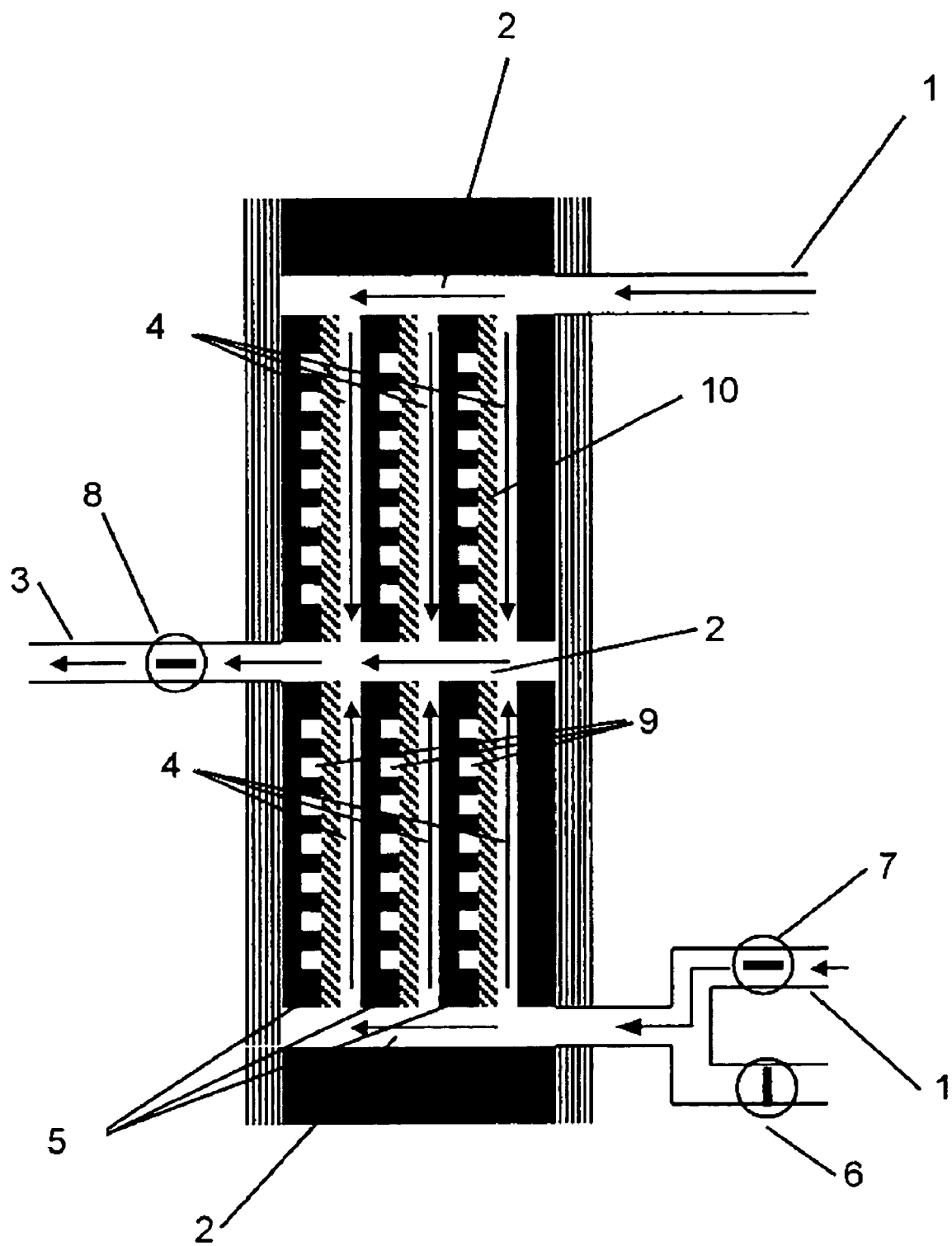
FIG. 3 shows the cross-sectional view of a schematic model with cathode gas flow direction for PEFC with a function of variable gas flow channel at the cathode side for high power load operation with parallel connection of gas flow channels according to the present invention.

The cross-sectional view of the schematic model with gas flow direction for PEFC with the function of the variable gas flow channel according to the present invention is shown in FIG. 3. This figure is the different situation obtained by the other selection of operation of switching devices 6, 7, 8, wherein the cathode gas of air is fed from two cathode gas feed inlets 1 to two cathode gas manifolds 2 in the center after being distributed into two cathode gas flow fields 4 fabricated on the gas flow plate 5 from two directions, and finally to cathode gas outlet 3 through the manifold 2 of the center. The switching device 6 is only closed in this case. The velocity of air through the gas flow fields is half of the case in FIG. 1 with the slight change of the switching device operation. The effect of the present invention is clearly recognized by the glance of the flow direction depicted in FIG. 4.

Figure 4:
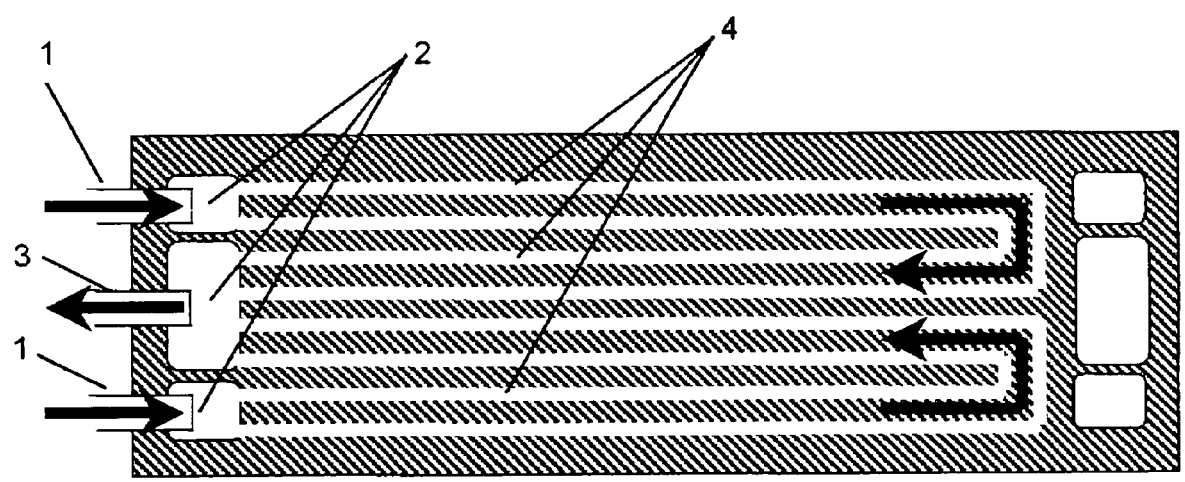
FIG. 4 shows the schematic cathode gas flow direction of the gas flow plate of PEFC for the high power load operation with parallel connection of gas flow channels according to the present invention.
Figure 5A:
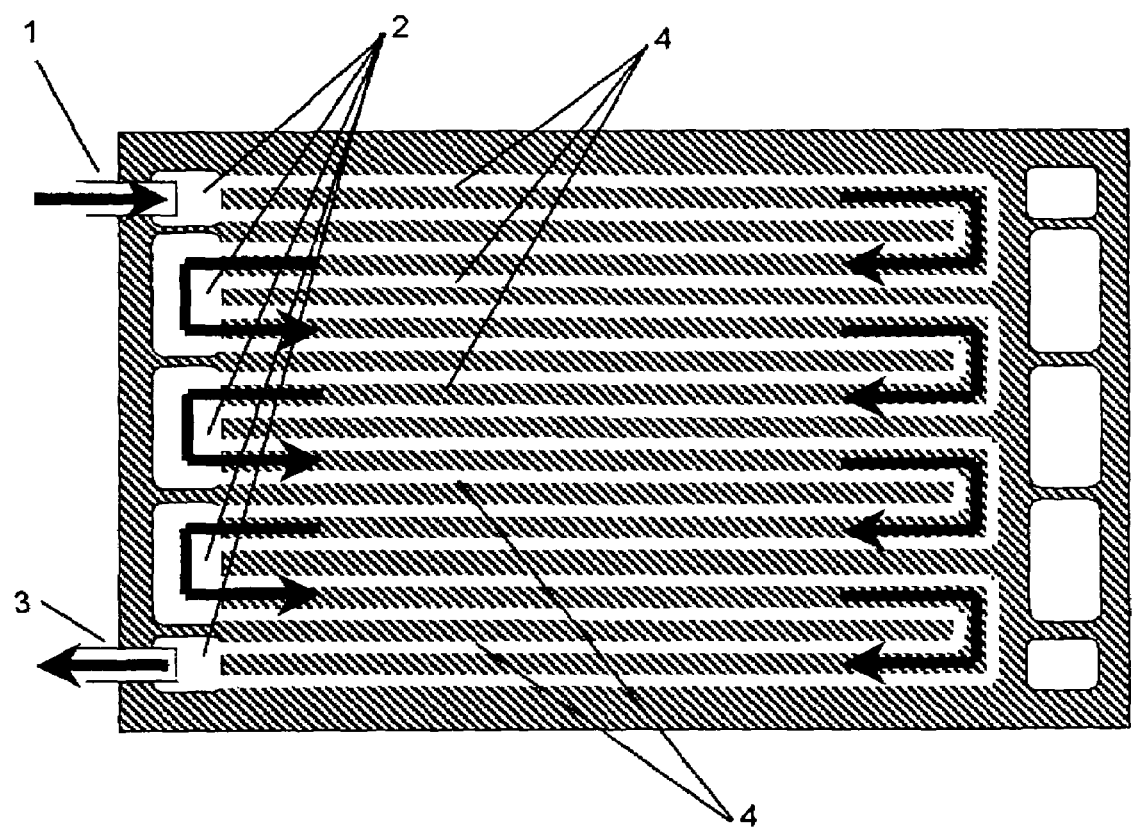
FIGS. 5A, B, C show the schematic cathode gas flow direction of the gas flow plate of PEFC with the function of three types of variable gas flow channels 4 series, 2 series –2 parallels, and 4 parallels, respectively, according to the present invention.
Figure 5B:
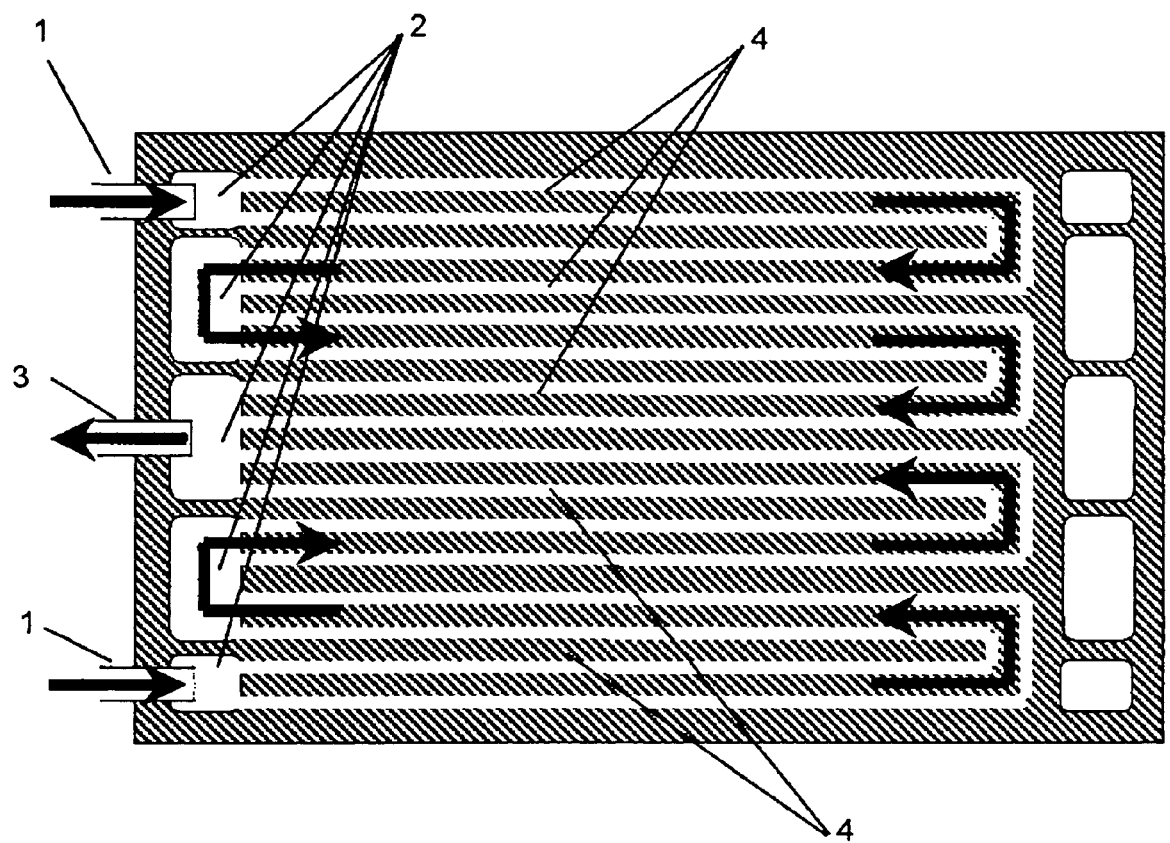
Figure 5C:
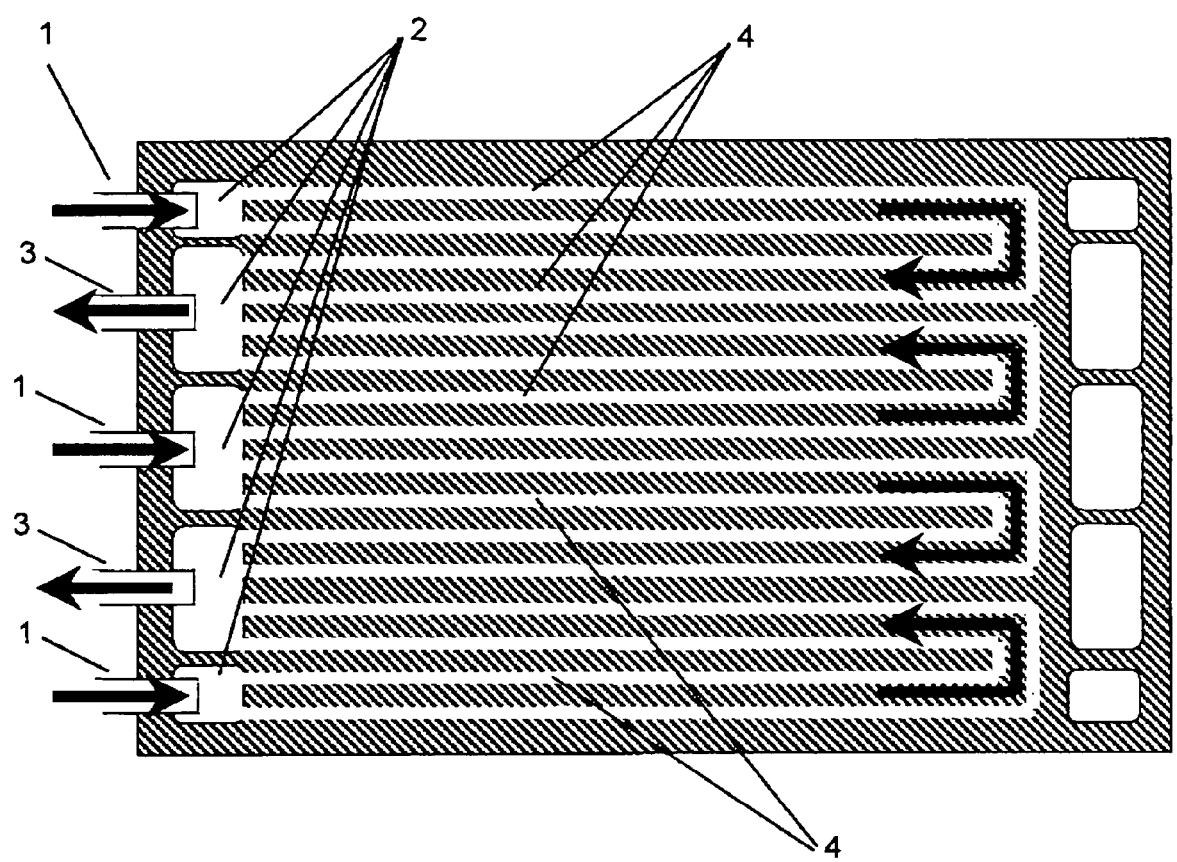

The preferable embodiment of the invention with the parallel connection type for the variable gas flow channel according to the present is shown in FIG. 4 with the same switching device operation as FIG. 3 wherein the situation is proper for the low power load condition to suppress the pressure drop leading to the high energy efficiency with the low consumption of energy needed for the auxiliary apparatuses of air and fuel gas pumps. Furthermore, the present invention is able to provide the three steps of variable gas flow channel for the PEFC with four gas flow channels is responsible for the wide range of power load. The representative gas flow direction of the gas flow field is only shown in FIG. 5, because of the clear effect of this invention. FIG. 5 A, FIG. 5 B and FIG. 5 C show the 4 series, 2 series—2 parallels, and 4 parallels connection type, respectively, with the slight change of the operation of the switching device for the same configuration of then PEFC. The PEFC with three gas flow channels is also responsible for the wide range of power load. For example, the PEFC is effective for wide power load range operation as idling and operating condition.

Figure 6:
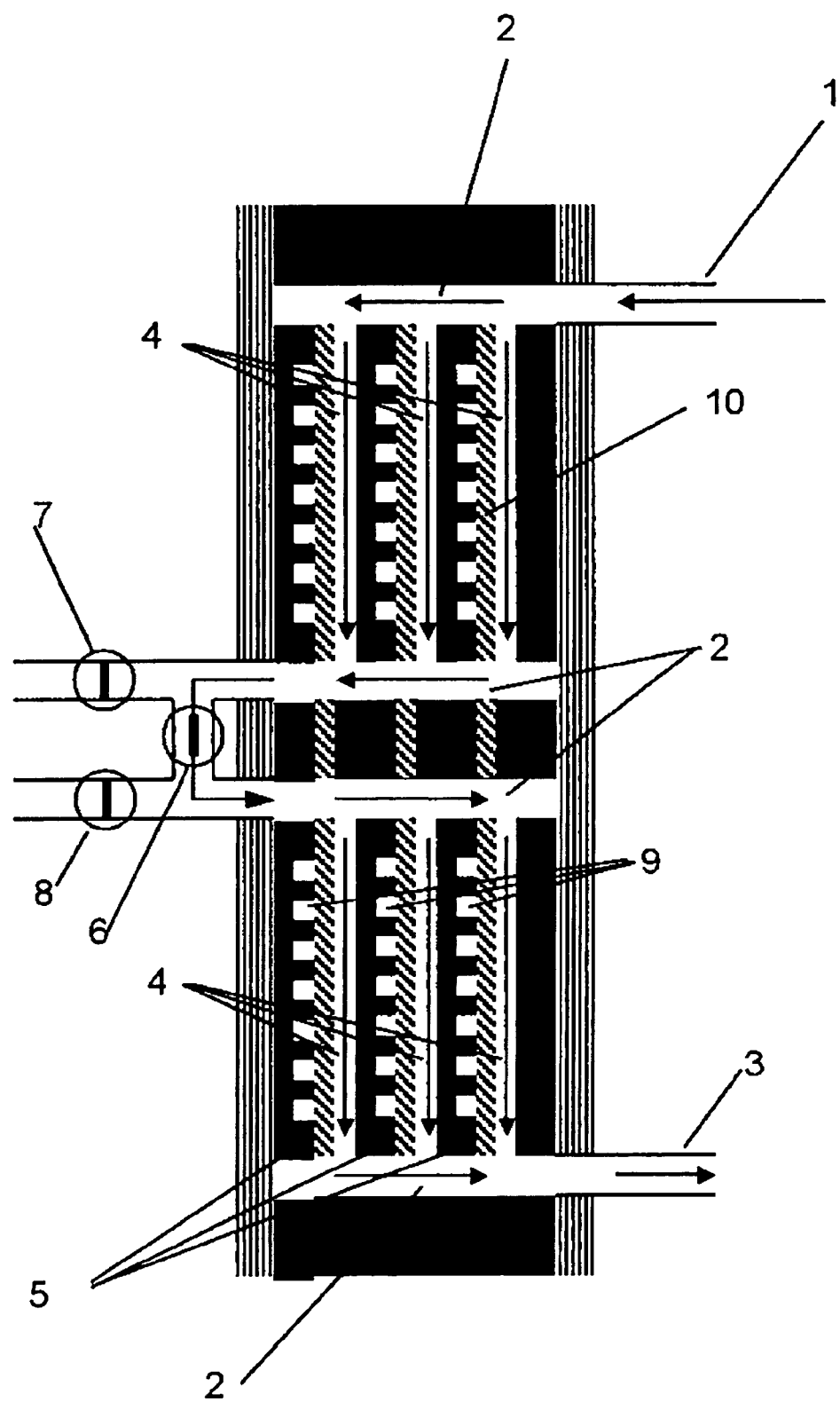
FIG. 6 shows the cross-sectional view of another schematic model with cathode gas flow direction for PEFC with a function of variable gas flow channel at the cathode side with series connection of gas flow channels for low power load operation according to the present invention.
Figure 7:
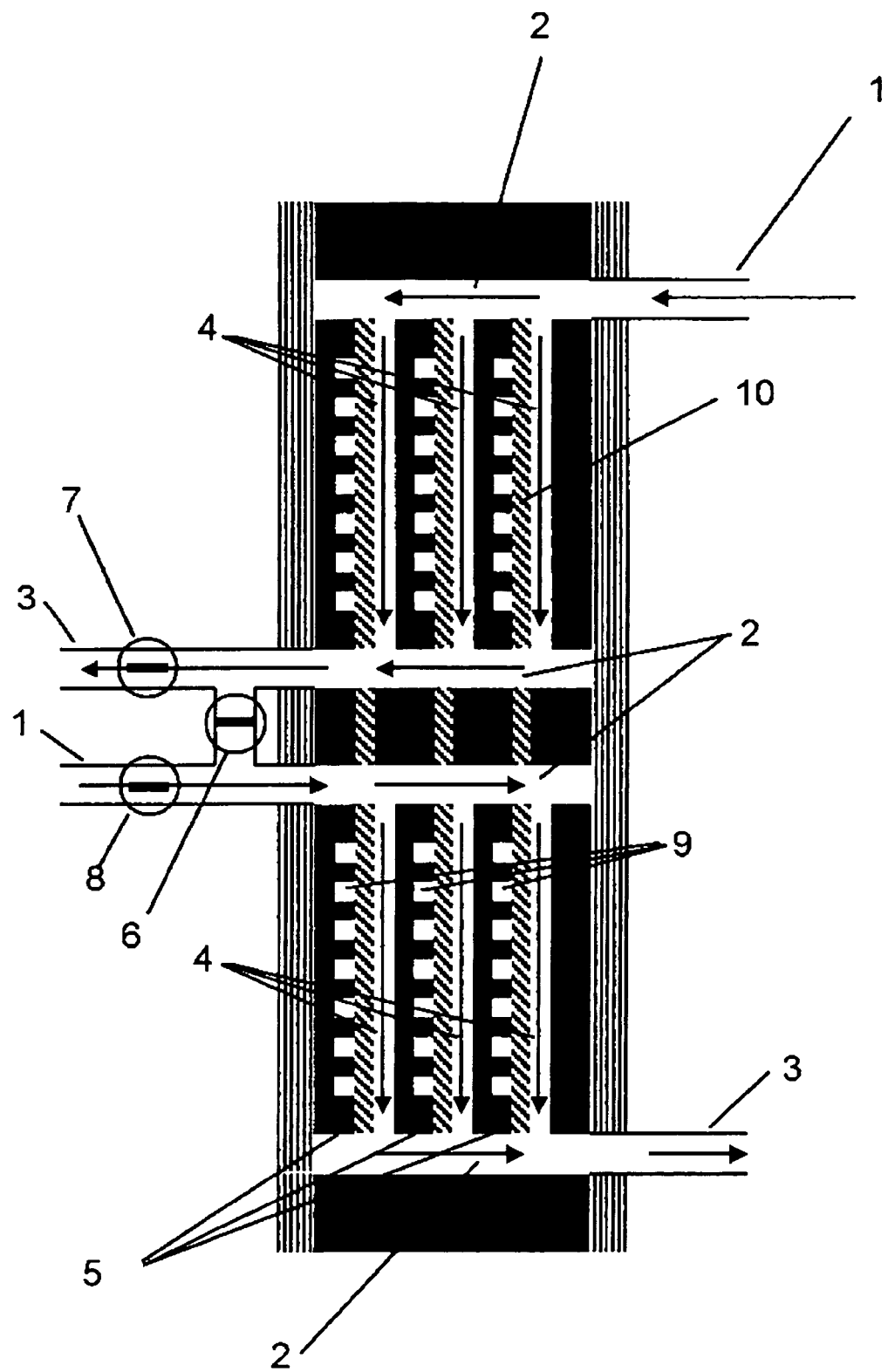
FIG. 7 shows the cross-sectional view of schematic model with cathode gas flow direction for PEFC with a function of variable gas flow channel at the cathode side with parallel connection of gas flow channels for high power load operation according to the present invention.

In the case of from FIG. 1 to FIG. 5, the PEFC comprises a gas manifold, which is shared by a plurality of the gas flow channels, for example, according to the present invention. This type of PEFC is able to be compact because of the number gas manifolds is small. FIG. 6 shows another type of PEFC according to the present invention with the same function without a change of gas flow direction by switching of the connection in the gas flow field for low power load operation with series connection of the gas flow channels according to the present invention. This type of PEFC is able to avoid the water flooding problem because gas flow direction can orient for the direction of gravity. The PEFC comprises a gas flow path, which connects the gas stream between the gas manifolds and has the switching device. FIG. 6 shows another type of PEFC with the same function without a change of gas flow direction in the gas flow field by switching of the connection for high power load operation with parallel connection of gas flow channels shown in FIG. 7.

Some examples according to the present invention are concretely described below.

EXAMPLE 1

Figure 8:
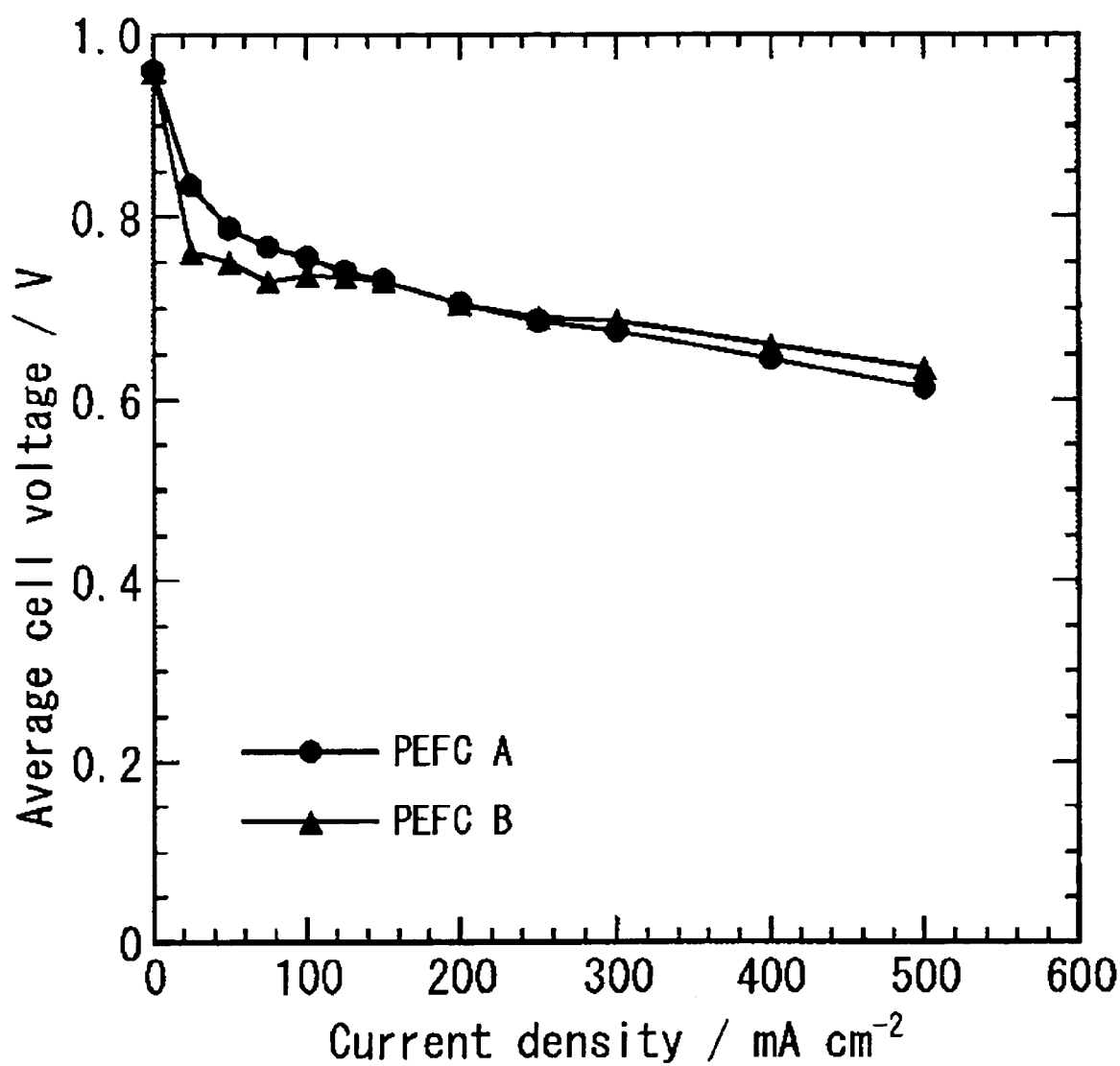
FIG. 8 shows the comparison of the representative I-V characteristics for the PEFC with function of a variable gas flow channel at the cathode side according to the present invention with one of the existing PEFC.
Figure 9:
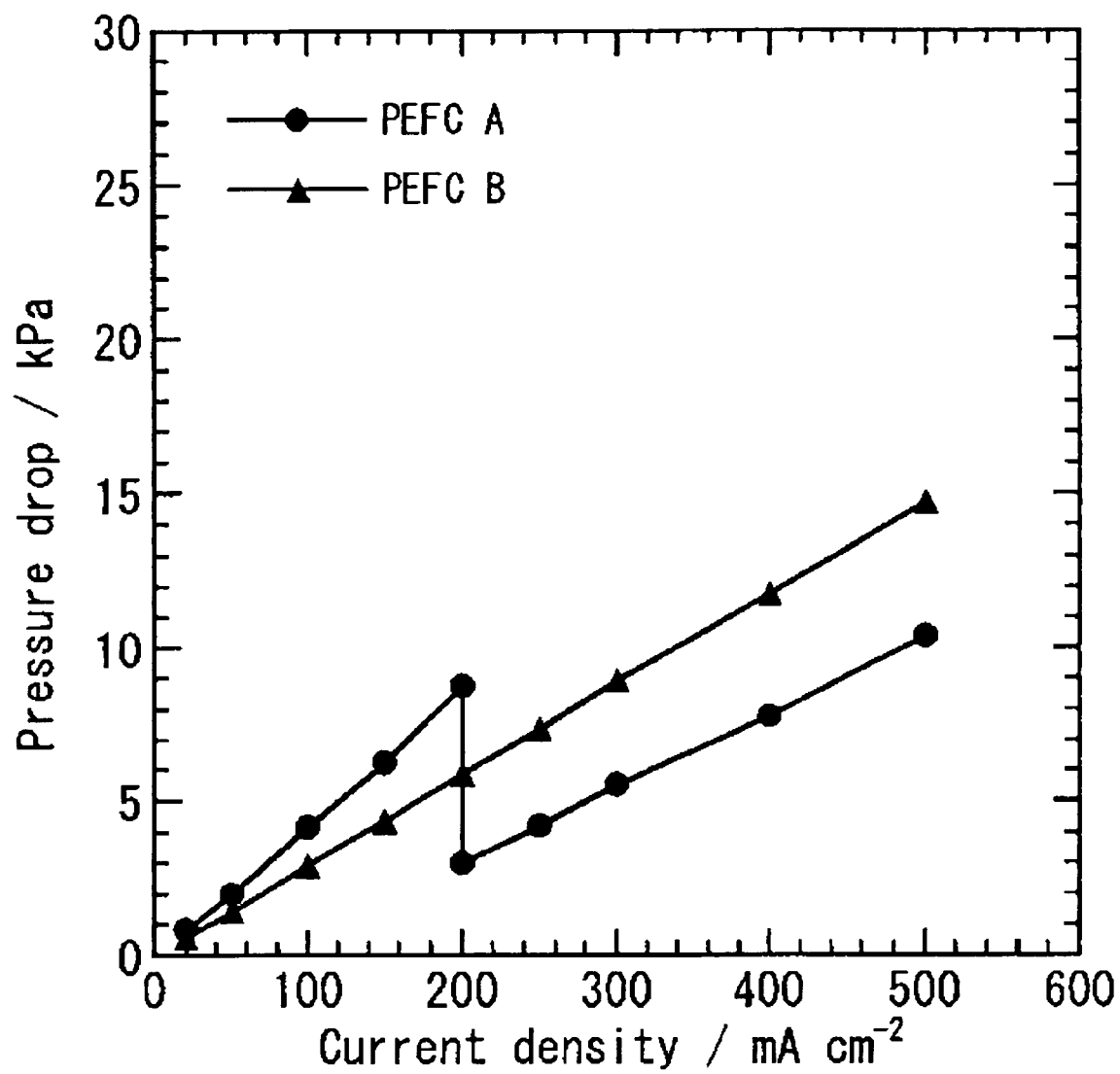
FIG. 9 shows the comparison of the representative pressure drop of cathode gas for the PEFC with function of a variable gas flow channel at the cathode side according to the present invention with one of the existing PEFC as the function of current density.
Figure 10:
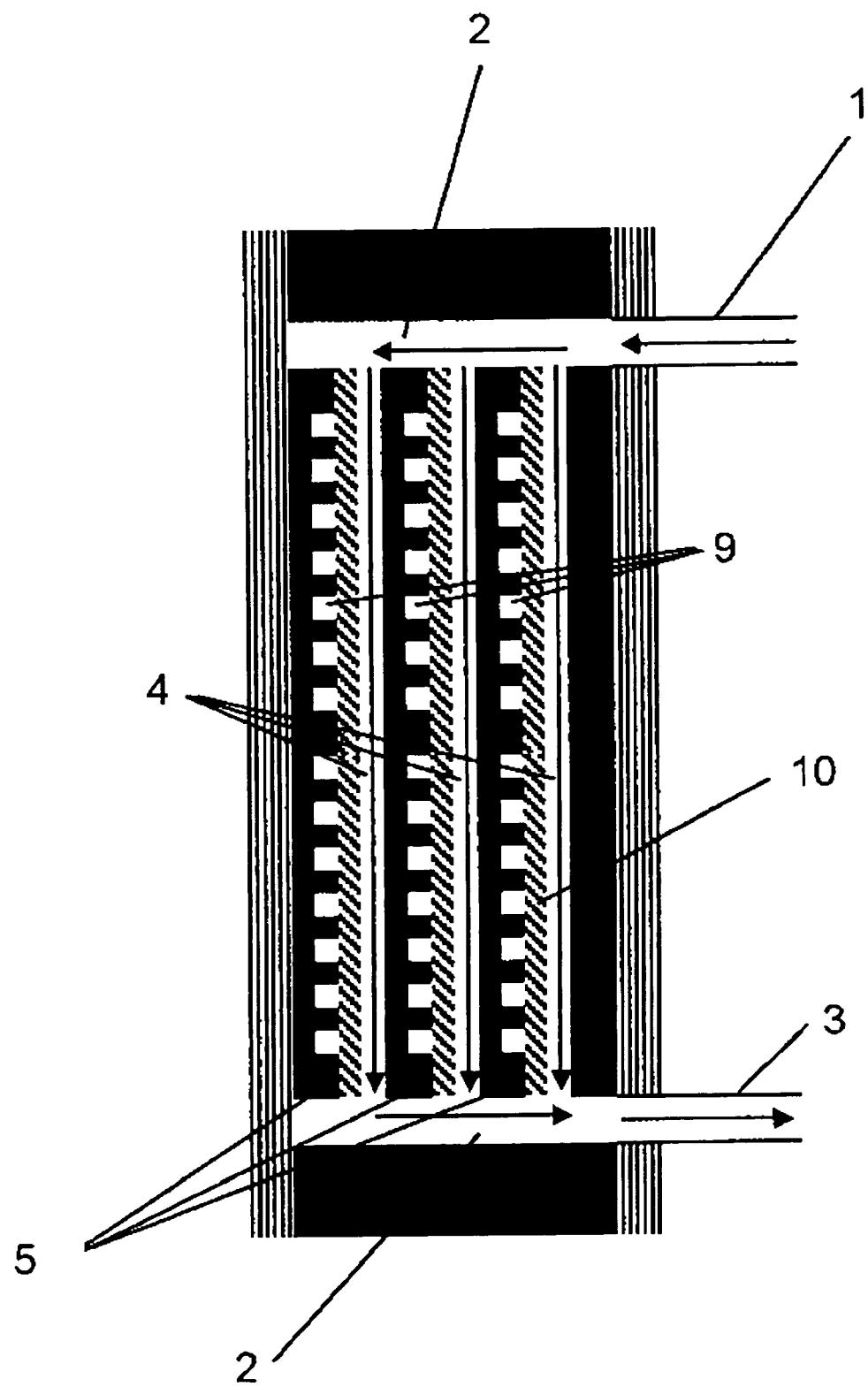
FIG. 10 shows the cross-sectional view of a schematic model with cathode gas flow direction for the existing PEFC with a conventional gas flow channel.
Figure 11:
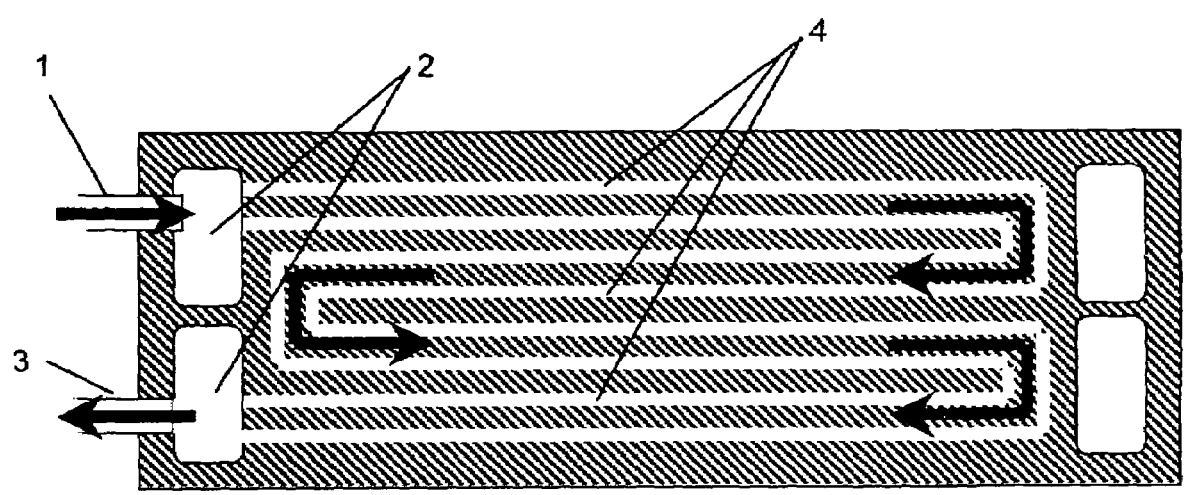
FIG. 11 shows the schematic cathode gas flow direction in the gas flow plate of PEFC for the existing gas flow channel.

The MEA was prepared by the hot-pressing of a cathode catalyst layer and an anode catalyst layer on both sides of polymer electrolyte membranes (Nafion 115) as reported in elsewhere (J. Soler et. al, Journal of the power sources, 118 (2003) 172-178, Proton Conducting Membrane Fuel Cells I, Edited by S. Gottesfeld, G. Halpert and A. Landgrebe, P115 published by Electrochemical Society, Inc. (1995)). Pt and Pt—Ru was used for catalyst metal of the cathode and anode, respectively. Each catalyst loading level was 0.5 mg/cm2, and surface area was 100 cm2. The PEFC A was designed with the three single cells in series. The single cell was composed of the following series constitution parts; an end plate, a gas flow plate, a gas diffusion backing, a membrane electrode assembly (MEA), a gas diffusion backing and an end plate. The gas flow plates were made of graphite with thickness of a 2 mm and had the serpentine gas flow channel with 1 mm groove width. The gas diffusion backing was used of carbon cloth of 0.2 mm thick treated with PTEF dispersion solution for hydrophobic property. The end plates were used the titanium plates with Au plating. The construction of PEFC A was the same as the PEFC depicted in FIG. 1 with the function of the variable gas flow channel at the cathode side. The performance for this PEFC A was investigated at the operation temperature of 80° C. under the condition of natural gas reformate (Hydrogen 80%, Carbon dioxide 20%, Carbon monoxide 10 ppm) as the anode gas and air as the cathode gas. Utilization of the air was 40% for operation of each current density. The gas flow rate of the reformate was constant of utilization 80% at 500 mA/cm2 for operation of each current density. Both gases were humidified at the same temperature. The operation voltage and pressure drop measured by the difference between inlet and outlet of cathode gas flow. The current-voltage and current-pressure drop characteristics are shown in FIG. 8 and FIG. 9. For reference, the existing PEFC B, was also prepared with the same process as the PEFC A without the variable gas flow channels. The PEFC A according to the present invention shows the superior performance in the current-voltage characteristics compared with the case of the existing PEFC B especially in the range of current density of 0 to 150 mA/cm2. This means that the PEFC A according to the present invention shows no occurrence of water flooding leading to the voltage drop in the operation voltage. This fact was strongly supported by the observation of the relatively higher velocity of the flow gas at the low current density under 200 mA/cm2 easily to expel the remained water of cathode in this present invention case. In the high current density region, the PEFC A according to the present invention shows the superior performance on the point of the pressure drop compared with the case of the existing PEFC B. This means that the present invention provides the high energy efficiency by the saving of the energy needed for the auxiliary apparatuses of the air feed pump.

EXAMPLE 2

Figure 12:
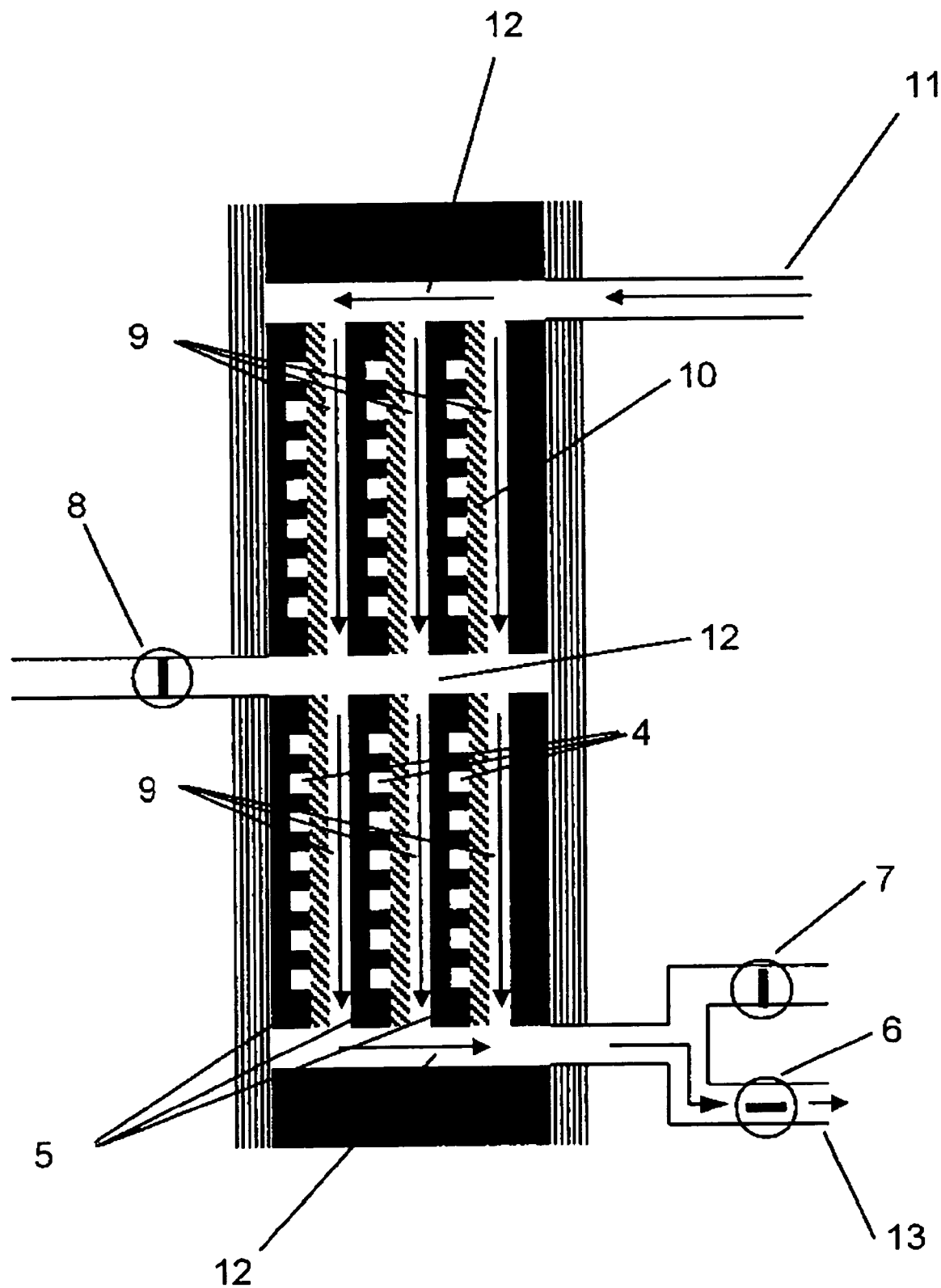
FIG. 12 shows the cross-sectional view of a schematic model with anode gas flow direction for PEFC with a function of variable gas flow channel at the anode side for low power load operation with series connection of gas flow channels according to the present invention.
Figure 13:
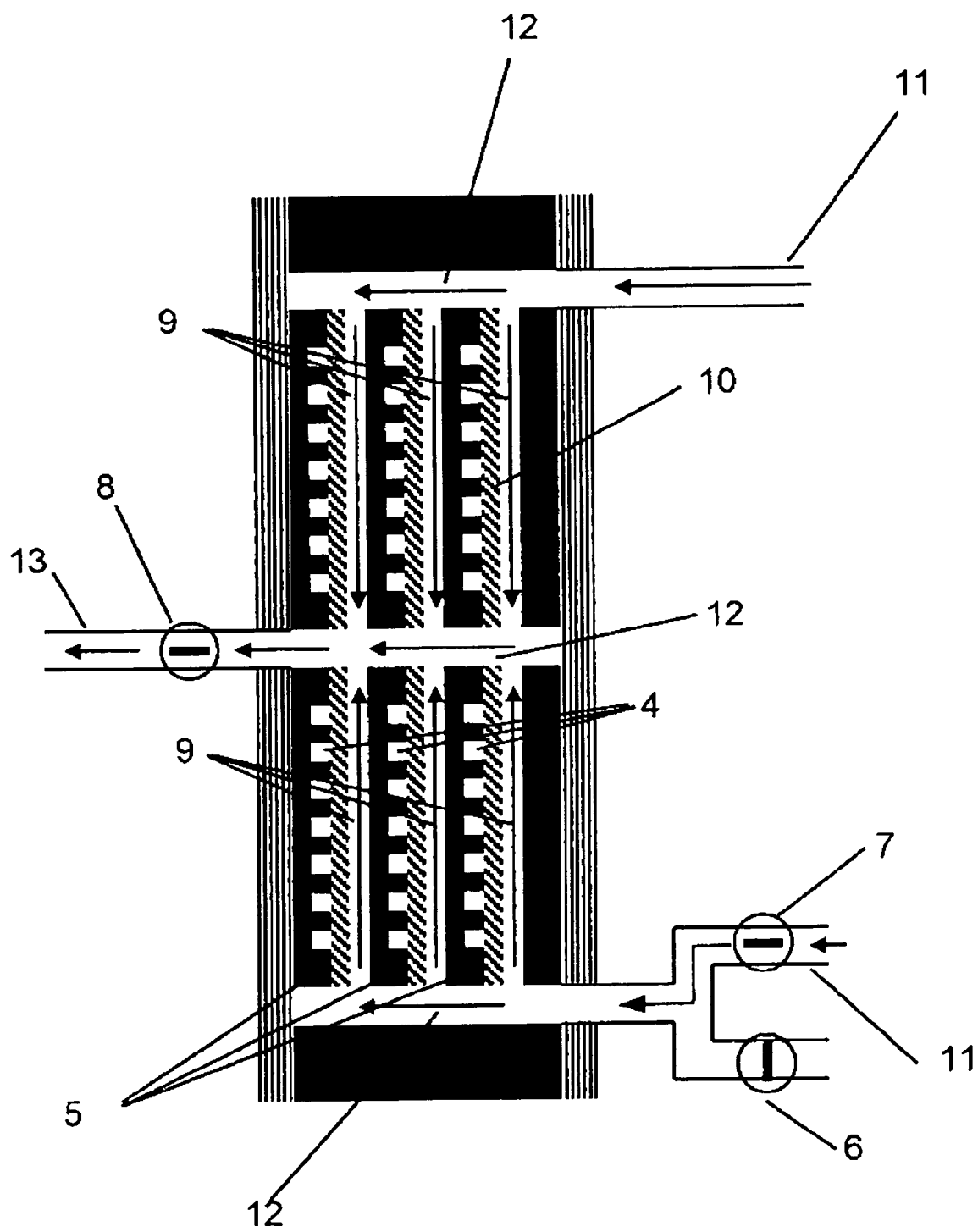
FIG. 13 shows the cross-sectional view of a schematic model with anode gas flow direction for PEFC with a function of variable gas flow channel at the anode side for high power load operation with parallel connection of gas flow channels according to the present invention.
Figure 14:
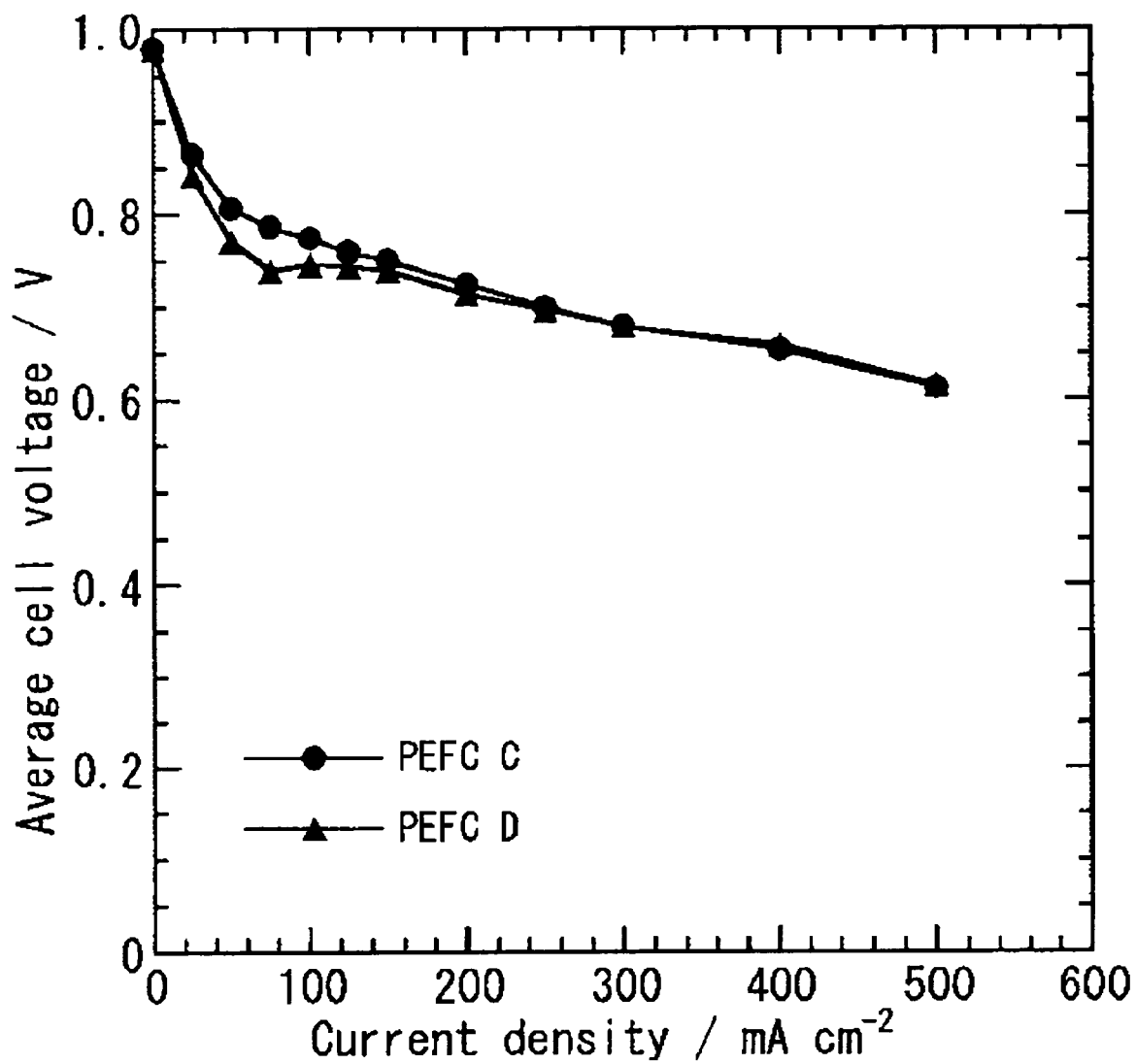
FIG. 14 shows the comparison of the representative I-V characteristics for the PEFC with function of variable gas flow channel at the anode side according to the present invention with one of the existing PEFC.
Figure 15:
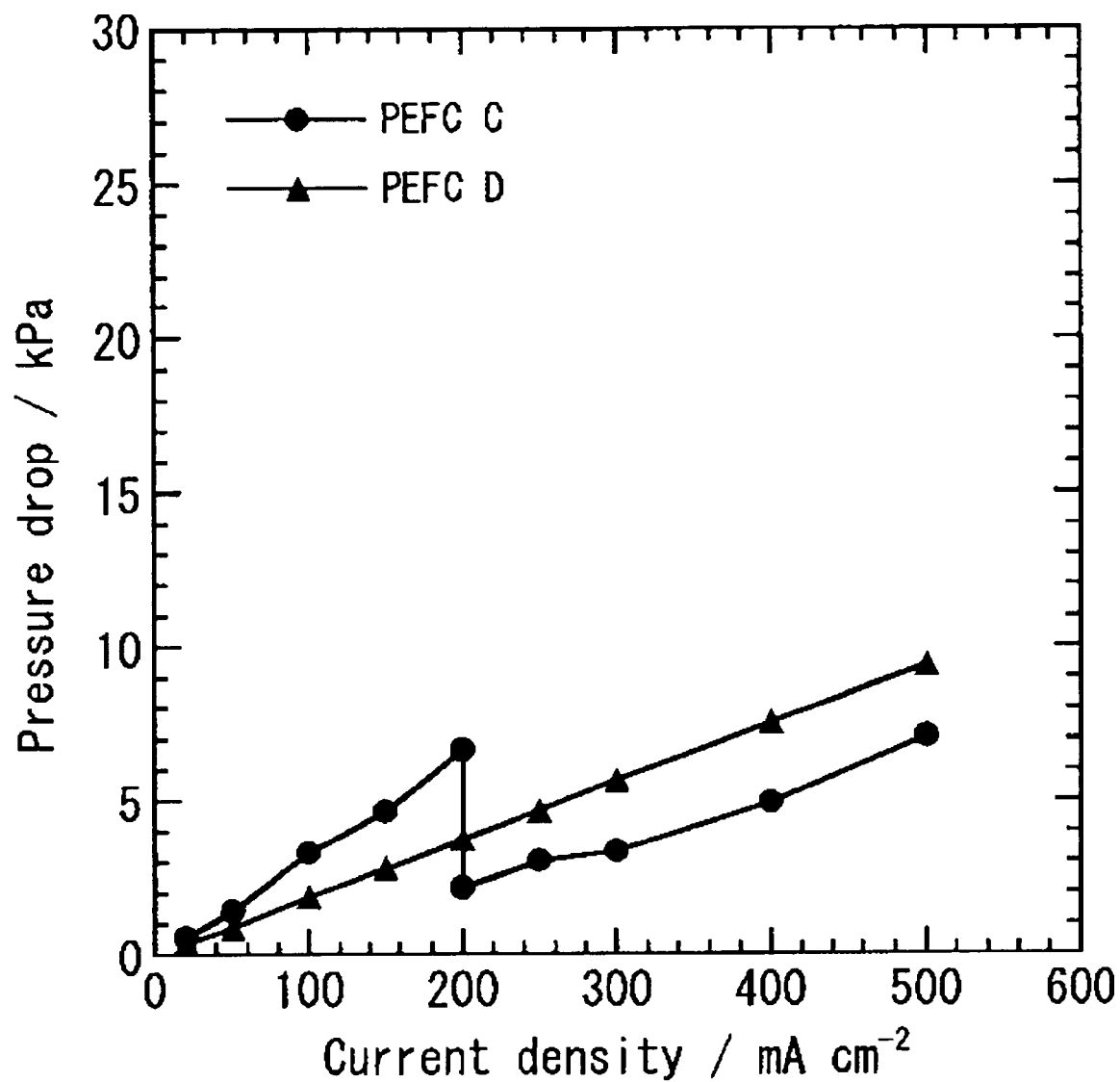
FIG. 15 shows the comparison of the representative pressure drop of anode gas for the PEFC with function of variable gas flow channel at the anode side according to the present invention with one of the existing PEFC as the function of current density.

The MEA was prepared by the hot-pressing of a cathode catalyst layer and an anode catalyst layer on both sides of polymer electrolyte membranes (Nafion 115) as reported in elsewhere. Pt and Pt—Ru was used for catalyst metal of cathode and anode respectively. Each catalyst loading level was 0.5 mgkm2, and the surface area was 100 cm2. The PEFC C was designed with the three single cells in series. The single cell was composed of the following series constitution parts; an end plate, a gas flow plate, a gas diffusion backing, a membrane electrode assembly (MEA), a gas diffusion backing, a gas flow plate and an end plate. The gas flow plates were made of graphite with a thickness of 2 mm and had the serpentine gas flow channel with 1 mm groove width. The gas diffusion backing was used of carbon cloth of 0.2 mm thick treated with PTFE dispersion solution for hydrophobic property. The end plates were used the titanium plates with Au plating. The construction of PEFC C was the same as the one depicted in FIG. 12 and FIG. 13 with the function of the variable gas flow channel at the anode side. FIG. 12 shows the cross-sectional view of schematic model with anode gas flow direction for PEFC with a function of variable gas flow channel at anode side for low power load operation with series connection of gas flow channels according to the present invention. FIG. 13 shows the cross-sectional view of schematic model with anode gas flow direction for PEFC with a function of variable gas flow channel at anode side for high power load operation with parallel connection of gas flow channels according to the present invention. Therefore, the model contains two gas flow channels for anode gas. The anode gas of reformate is fed from its feed inlet 11 to the first anode gas manifold 12 and distributed into the anode gas flow field 9 fabricated on the gas flow plate 5 and finally to the anode gas outlet 13 with switching device 6 through third anode gas manifold 12. The second anode gas manifold of the center is not used for gas distribution in this case. Switching devices 7 and 8 are closed in this case. The flow field geometry of the anode gas flow field is not depicted for the clearness of gas direction. The anode gas flow field 9 and MEA 10 are also depicted in FIG. 12. The performance for this PEFC C was investigated at the operation temperature of 80° C. under the condition of natural gas reformate (Hydrogen 80%, Carbon dioxide 20%, Carbon monoxide 10 ppm) as anode gas and air as cathode gas. The flow rate of the air was constant of utilization 40% at 500 mA/cm2 for operation of each current density, Utilization of the reformate was 80% for operation of each current density. Both gases were humidified at the same temperature. The operation voltage and pressure drop measured by the difference between inlet and outlet of anode gas flow. The current-voltage and current-pressure drop characteristics are shown in FIG. 14 and FIG. 15. For reference, the existing PEFC D was also prepared with the same process described in example 2 without variable gas flow channels. The PEFC C according to the present invention shows the superior performance in the current-voltage characteristics compared with the case of the existing PEFC D especially in the range of current density of 0 to 150 mA/cm$^2$. This means that the PEFC C according to the present invention shows no occurrence of water flooding leading to the voltage drop in the operation voltage. This fact was strongly supported by the observation of relatively higher velocity of the flow gas under the low current density under 200 mA/cm2 easily to expel the water of anode in this present invention-case. In the high current density region, the PEFC C according to the present invention shows the superior performance on the point of the pressure drop compared with the case of the existing PEFC D. This means that the present invention provides the high energy efficiency by the saving the energy needed for the auxiliary apparatuses of anode gas feed pump.

Needless to say, the PEFC with the function at both anode and cathode sides provides the superior performance.

What is claimed is:

1. A fuel cell system comprising:
   a fuel cell having a gas flow plate;
   a first gas flow channel and a second gas flow channel both provided in said gas flow plate such that a flow of gas along said gas flow plate is able to flow in a series flow from one of said first and second gas flow channels to the other of said first and second gas flow channels, and in a parallel flow along both of said first and second gas flow channels; and
   switching devices for switching the flow of gas from the parallel flow to the series flow, and from the series flow to the parallel flow.

2. A fuel cell system comprising:
   a fuel cell having a gas flow plate;
   a first gas flow channel and a second gas flow channel both provided in said gas flow plate such that a flow of gas along said gas flow plate is able to flow in a series flow from one of said first and second gas flow channels to the other of said first and second gas flow channels, and in a parallel flow along both of said first and second gas flow channels; and
   switching devices for switching the flow of gas from the parallel flow to the series flow, and from the series flow to the parallel flow,
   wherein said switching devices are arranged outside of said cell.

3. A fuel cell system comprising:
   a fuel cell having a gas flow plate;
   a first gas flow channel and a second gas flow channel both provided in said gas flow plate, said first gas flow channel extending from a first manifold to a second manifold, said second gas flow channel extending from said second manifold to a third manifold; and
   switching devices for controlling a flow of gas through at least one of said first, second and third manifolds so as to switch a flow of gas along said first and second gas flow channels from a parallel flow to a series flow, and from a series flow to a parallel flow.

4. A fuel cell system comprising:
   a fuel cell having a gas flow plate;
   a first gas flow channel and a second gas flow channel both provided in said gas flow plate, said first gas flow channel extending from a first manifold to a second manifold, said second gas flow channel extending from a third manifold to a fourth manifold, said second manifold and said third manifold being connected by a gas flow path; and
   switching devices for controlling a flow of gas between said second manifold and said third manifold so as to switch a flow of gas along said first and second gas flow channels from a parallel flow to a series flow, and from a series flow to a parallel flow.

5. The fuel cell system according to claims 1, 2, 3 or 4 wherein said first and second gas flow channels are cathode gas flow channels.

6. The fuel cell system according to claims 1 or 2, further comprising:
   a gas manifold connected to said first gas flow channel and said second gas flow channel.

7. The fuel cell system according to claims 1 or 2, wherein said cell includes a gas diffusion backing, and wherein the fuel cell system further includes a gas flow path for allowing a gas to flow between said first gas flow channel and said second gas flow channel without contacting said gas diffusion backing.

8. The fuel cell system according to claims 1, 2 or 3, further comprising:
   a first pipe having a first one of said switching devices;
   a second pipe having a second one of said switching devices; and
   a third pipe having a third one of said switching devices, wherein said first pipe is connected to an end of said first gas flow channel and a first end of said second gas flow channel, and wherein said second and third pipes are connected to a second end of said second gas flow channel.

9. The fuel cell system according to claims 1, 2 or 4, further comprising:
   a first pipe having a first one of said switching devices; and
   a second pipe having a second one of said switching devices, wherein said first pipe is connected to an end of said first gas flow channel, said second pipe is connected to a first end of said second gas flow channel, and wherein a portion of said first pipe between said first one of said switching devices and said end of said first gas flow channel is connected to a portion of said second pipe between said second one of said switching devices and said first end of said second gas flow channel by a third one of said switching devices.

10. The fuel cell system according to claims 1, 2, 3 or 4, wherein at least one of said switching devices is a valve.

11. The fuel cell system according to claims 1, 2, 3 or 4, wherein said fuel cell system is a polymer electrolyte fuel cell system.

12. The fuel cell system according to claims 1, 2, 3 or 4, wherein said fuel cell system comprises a polymer electrolyte fuel cell stack comprising said cell.

13. The fuel cell system according to claim 4, wherein said cell includes a gas diffusion backing, and wherein the gas flow path is arranged so as to allow a gas to flow between said first gas flow channel and said second gas flow channel without contacting said gas diffusion backing.

* * * * *